USO10127364B2

United States Patent
Tapscott et al.

(10) Patent No.: US 10,127,364 B2
(45) Date of Patent: Nov. 13, 2018

(54) MANAGING AUTHORIZATION CODES FROM MULTIPLE SOURCES (71) Applicant: Carwashfinder Inc., Cambridge (CA)

(72) Inventors: Jared Jonathan Tapscott, Toronto (CA); Matthew William Spalding, Etobicoke (CA); Nathan Stewart Ewing, Branchton (CA); Peter Anthony Benford, Hartsfield, GA (US)

(73) Assignee: Carwashfinder Inc., Cambridge, Ontario (CA)

( * ) Notice: Subject to any disclaimer, the term of this patent is extended or adjusted under 35 U.S.C. 154(b) by 68 days.

(21) Appl. No.: 15/098,182

(22) Filed: Apr. 13, 2016

(65) Prior Publication Data
US 2016/0300047 A1 Oct. 13, 2016

Related U.S. Application Data (60) Provisional application No. 62/146,455, filed on Apr. 13, 2015.

(51) Int. Cl.
*G06F 21/31* (2013.01)
*G07F 11/00* (2006.01)
(Continued)

(52) U.S. Cl.
CPC ......... *G06F 21/31* (2013.01); *G06Q 20/4012* (2013.01); *G07F 11/002* (2013.01);
(Continued)

(58) Field of Classification Search
CPC .... G06F 21/31; G06Q 20/4012; G06Q 20/20; G06Q 30/0238; G07F 17/20; G07F 11/002; G07F 5/18; H04L 67/12
See application file for complete search history.

(56) References Cited

U.S. PATENT DOCUMENTS 6,402,030 B1 * 6/2002 Summers ............. G06Q 20/342
235/375
7,201,315 B2 4/2007 Symonds et al.
(Continued)

FOREIGN PATENT DOCUMENTS

CA 2287431 10/1998
CA 2326344 10/1999
(Continued)

OTHER PUBLICATIONS

Unitec; WashPay Card Terminal Retrofit Installation Instructions; WP1004.

*Primary Examiner* — Theodore C Parsons
(74) *Attorney, Agent, or Firm* — Steven M. Greenberg, Esq.; Shutts & Bowen LLP (57) ABSTRACT The present disclosure describes apparatus, systems and methods in which a first data storage is maintained for a first group of authorization codes, for example those associated with a local POS system, and second data storage, logically separate from the first data storage, is maintained for a second group of authorization codes, such as those associated with a remote or online sales system. Access control is achieved by checking a received authorization code for validity against one or both groups of authorization codes, without needing to integrate different code assignment systems or different sales systems with one another. The technology has particular utility for automated car wash systems, although it is not limited thereto, and embodiments of the technology may be retrofit to existing car wash control interfaces.

20 Claims, 6 Drawing Sheets (51) Int. Cl.
  *G07F 17/20* (2006.01)
  *G06Q 20/40* (2012.01)
  *H04L 29/08* (2006.01)
  *G06Q 20/20* (2012.01)
(52) U.S. Cl.
  CPC ............ *G07F 17/20* (2013.01); *G06Q 20/20* (2013.01); *H04L 67/12* (2013.01)

(56) References Cited

U.S. PATENT DOCUMENTS

| | | | |
|---|---|---|---|
| 7,637,365 | B2 | 12/2009 | Ringdahl et al. |
| 9,117,233 | B2 | 8/2015 | Harter |
| 9,802,581 | B2 | 10/2017 | Harter |
| 2001/0042007 | A1 | 11/2001 | Klingle |
| 2008/0215505 | A1 | 9/2008 | Reynolds |
| 2008/0277466 | A1* | 11/2008 | Dohm ............... G06Q 10/06 235/382 |
| 2012/0253973 | A1 | 10/2012 | Harter |
| 2014/0074605 | A1 | 3/2014 | Sanchez et al. |
| 2014/0379530 | A1 | 12/2014 | Kim et al. |
| 2015/0032558 | A1 | 1/2015 | Bonk et al. |
| 2015/0371228 | A1* | 12/2015 | Kershaw ............. G06Q 20/28 705/77 |

FOREIGN PATENT DOCUMENTS

| | | |
|---|---|---|
| CA | 2371879 | 9/2000 |
| CA | 2377289 | 9/2000 |
| CA | 2313940 A1 | 1/2001 |
| CA | 2388156 | 5/2001 |
| CA | 2417761 A1 | 2/2002 |
| CA | 2421084 A1 | 3/2002 |
| CA | 2421247 A1 | 3/2002 |
| CA | 2372413 A1 | 9/2002 |
| CA | 2489330 | 1/2004 |
| CA | 2418638 | 8/2004 |
| CA | 2457263 | 8/2004 |
| CA | 2727717 A1 | 12/2009 |
| CA | 2749876 A1 | 7/2010 |
| CA | 2831065 | 9/2012 |
| CA | 2841974 | 1/2013 |
| CA | 2851836 A1 | 5/2013 |
| CA | 2890321 A1 | 1/2014 |
| CA | 2826517 | 3/2014 |
| CA | 2826794 | 3/2014 |
| CA | 2885536 A1 | 3/2014 |
| DE | 102013217854 A1 | 3/2014 |
| JP | 2001319273 A | 11/2001 |
| JP | 2001351168 A | 12/2001 |
| JP | 2002042235 A | 2/2002 |
| JP | 2002063648 A | 2/2002 |
| JP | 2002074504 A | 3/2002 |
| JP | 2003122840 A | 4/2003 |
| JP | 2004155266 A | 6/2004 |
| JP | 2009301073 A | 12/2009 |
| WO | 200156313 A1 | 8/2001 |
| WO | 2008154039 A1 | 12/2008 |
| WO | 2015017308 A1 | 5/2015 |

\* cited by examiner

MANAGING AUTHORIZATION CODES FROM MULTIPLE SOURCES

CROSS-REFERENCE TO RELATED APPLICATIONS

This application claims the benefit of U.S. Provisional Application No. 62/146,455, filed Apr. 13, 2015.

TECHNICAL FIELD

The present disclosure relates to access control applications, and more particularly to access control applications using authorization codes.

BACKGROUND

Automated car wash systems represent one common application where authorization codes are used to control access. For example, a gas station may have an automated car wash with a keypad positioned at the entrance, and may have a point-of-sale (POS) system which can issue authorization codes to customers to be entered using the keypad. In a typical embodiment, when an authorization code is entered at the keypad, a microcontroller will communicate with a data storage maintained by the POS system to check whether the keyed authorization code is valid. If the keyed authorization code is valid, access will be granted and the car wash procedure will be initiated.

It is desirable for customers to be able to purchase car wash services remotely, such as online via a computer or mobile device such as a smartphone, since such electronic commerce ("e-commerce") is widely accepted by consumers as a convenient way to order goods and services. While those skilled in the art can readily develop an e-commerce platform that will accept payment and issue authorization codes, there are difficulties associated with integrating such an e-commerce platform with the relevant POS systems and/or car wash control systems.

SUMMARY

Broadly speaking, the present disclosure describes apparatus, systems and methods in which a first data storage is maintained for a first group of authorization codes, for example those associated with a local POS system, and second data storage, logically separate from the first data storage, is maintained for a second group of authorization codes, such as those associated with a remote or online sales system. Access control is achieved by checking a received authorization code for validity against one or both groups of authorization codes, without needing to integrate different code assignment systems or different sales systems with one another.

In one aspect, a control interface for a car wash comprises a car wash controller coupled to a plurality of car wash elements for controlling the car wash elements, a keypad, and a first microcontroller. The first microcontroller is coupled to the keypad, to the car wash controller and to a first data storage containing a first group of valid authorization codes. The first microcontroller is configured to receive a keyed authorization code from the keypad and communicate with the first data storage to compare the keyed authorization code to the first group of valid authorization codes. Responsive to the keyed authorization code matching one of the valid authorization codes in the first group of valid authorization codes, the first microcontroller will instruct the car wash controller to initiate a car wash according to the matched one of the valid authorization codes in the first group of valid authorization codes. The control interface further comprises an additional input device and a second microcontroller coupled to the additional input device. The second microcontroller is coupled to the car wash controller and to a second data storage containing a second group of valid authorization codes. The second microcontroller is configured to receive an authorization code from the additional input device and communicate with the second data storage to compare the received authorization code to the second group of valid authorization codes. Responsive to the received authorization code matching one of the valid authorization codes in the second group of valid authorization codes, the second microcontroller will instruct the car wash controller to initiate a car wash according to the matched one of the valid authorization codes in the second group of valid authorization codes.

The additional input device may be one of a second keypad, a barcode reader, and a wireless receiver for receiving wireless communication signals.

In some embodiments, the second microcontroller is coupled directly to the car wash controller. In other embodiments, the second microcontroller is coupled indirectly to the car wash controller. For example, the second microcontroller may be coupled indirectly to the car wash controller by the second microcontroller being coupled to the first microcontroller, or the first microcontroller may be coupled to the car wash controller indirectly by the first microcontroller being coupled to control terminals on a control board, with the control board being coupled to the car wash controller, and the second microcontroller may be coupled to the car wash controller by being coupled to the control terminals on the control board in parallel with the first microcontroller.

In another aspect, a control interface for a car wash comprises a car wash controller coupled to a plurality of car wash elements for controlling the car wash elements, a keypad and a first microcontroller. The first microcontroller is coupled to the keypad, to the car wash controller, to a first data storage containing a first group of valid authorization codes and to a second data storage containing a second group of valid authorization codes. The first microcontroller is configured to receive a keyed authorization code from the keypad and determine whether the keyed authorization code is associated with the first group of valid authorization codes or the second group of valid authorization codes. Responsive to a determination that the keyed authorization code is associated with the first group of valid authorization codes, the first microcontroller will communicate with the first data storage to compare the keyed authorization code to the first group of valid authorization codes. Responsive to the keyed authorization code matching one of the valid authorization codes in the first group of valid authorization codes, the first microcontroller will instruct the car wash controller to initiate a car wash according to the matched one of the valid authorization codes in the first group of valid authorization codes.

In some embodiments, the first microcontroller is further configured to, responsive to a determination that the keyed authorization code is associated with the second group of valid authorization codes, communicate with the second data storage to compare the keyed authorization code to the second group of valid authorization codes. Responsive to the keyed authorization code matching one of the valid authorization codes in the second group of valid authorization codes, the first microcontroller will instruct the car wash controller to initiate a car wash according to the matched one of the valid authorization codes in the second group of valid authorization codes.

In some embodiments, the first microcontroller is coupled to a second microcontroller, and the second microcontroller is coupled to the car wash controller. In such embodiments, the first microcontroller may be further configured to, responsive to a determination that the keyed authorization code is associated with the second group of valid authorization codes, transmit the keyed authorization code to the second microcontroller. The second microcontroller is configured to, responsive to receiving the keyed authorization code from the first microcontroller, communicate with the second data storage to compare the keyed authorization code to the second group of valid authorization codes. Responsive to the keyed authorization code matching one of the valid authorization codes in the second group of valid authorization codes, the second microcontroller will instruct the car wash controller to initiate a car wash according to the matched one of the valid authorization codes in the second group of valid authorization codes.

In some embodiments, the determination that the keyed authorization code is associated with the second group of valid authorization codes results from the keyed authorization code failing to match any of the valid authorization codes in the first group of valid authorization codes. In other embodiments, the first microcontroller is configured to determine whether the keyed authorization code is associated with the first group of valid authorization codes or the second group of valid authorization codes according to a format of the keyed authorization code. In still further embodiments, the first microcontroller is configured to determine whether the keyed authorization code is associated with the first group of valid authorization codes or the second group of valid authorization codes according to an indicator signal.

In some embodiments, the control interface may further comprise an additional input device coupled to the microcontroller, wherein the first microcontroller is configured to determine whether the keyed authorization code is associated with the first group of valid authorization codes or the second group of valid authorization codes based on the input device used wherein an authorization code received from the keypad is associated with the first group of valid authorization codes and an authorization code received from the additional input device is associated with the second group of valid authorization codes.

In a further aspect, a method for controlling a car wash comprises receiving an authorization code and determining whether the authorization code is associated with a first group of valid authorization codes stored in a first storage or a second group of valid authorization codes stored in a second storage. Responsive to a determination that the authorization code is associated with the first group of valid authorization codes, the method compares the authorization code to the first group of valid authorization codes, and, responsive to the authorization code matching one of the valid authorization codes in the first group of valid authorization codes, the method initiates the car wash according to the matched one of the valid authorization codes in the first group of valid authorization codes. Responsive to a determination that the authorization code is associated with the second group of valid authorization codes, the method compares the authorization code to the second group of valid authorization codes, and responsive to the authorization code matching one of the valid authorization codes in the second group of valid authorization codes, the method initiates the car wash according to the matched one of the valid authorization codes in the second group of valid authorization codes.

In some embodiments, determining whether the authorization code is associated with a first group of valid authorization codes stored in a first storage or a second group of valid authorization codes stored in a second storage comprises determining a format of the authorization code. In other embodiments, determining whether the authorization code is associated with a first group of valid authorization codes stored in a first storage or a second group of valid authorization codes stored in a second storage is based on an input device via which the authorization code was received.

In yet a further aspect, a method for controlling a car wash comprises receiving an authorization code and comparing the authorization code to the first group of valid authorization codes stored in a first storage. Responsive to the authorization code matching one of the valid authorization codes in the first group of valid authorization codes, the method initiates the car wash according to the matched one of the valid authorization codes in the first group of valid authorization codes. Responsive to a determination that the authorization code fails to match any of the valid authorization codes in the first group of valid authorization codes, the method compares the authorization code to the second group of valid authorization codes. Responsive to the authorization code matching one of the valid authorization codes in the second group of valid authorization codes, the method initiates the car wash according to the matched one of the valid authorization codes in the second group of valid authorization codes.

BRIEF DESCRIPTION OF THE DRAWINGS

These and other features will become more apparent from the following description in which reference is made to the appended drawings wherein.

DETAILED DESCRIPTION

Figure 1:
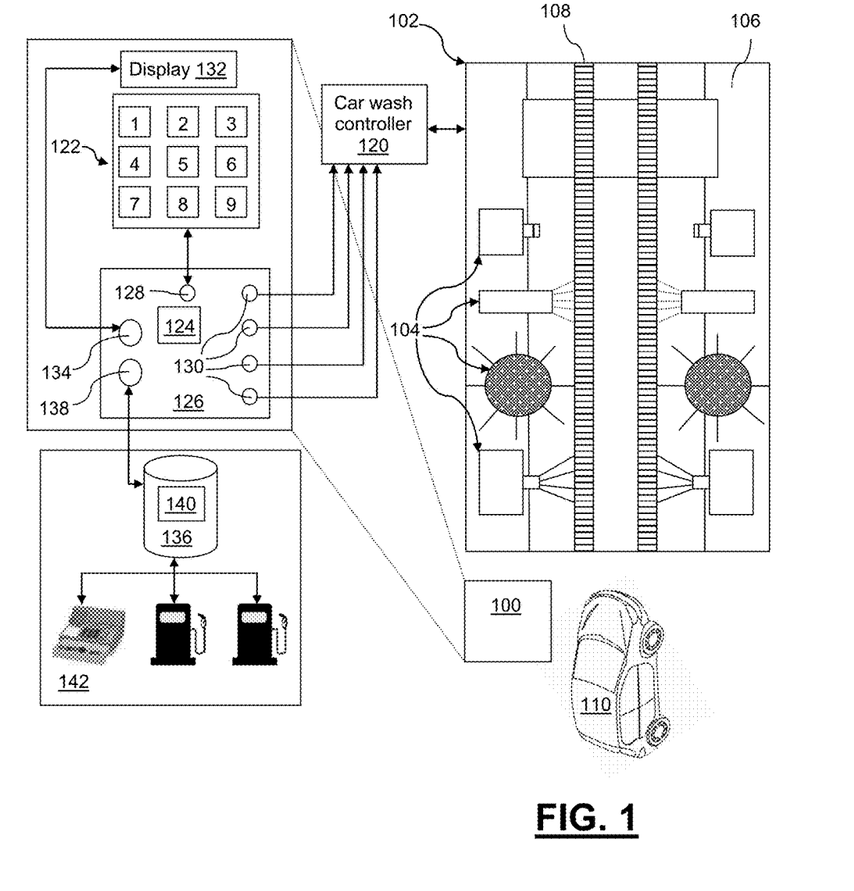
FIG. 1 is a schematic block diagram showing an exemplary prior art control interface for a car wash.

Reference is now made to FIG. 1, which is a schematic block diagram showing an exemplary prior art control interface 100 for a car wash 102. The car wash 102 is an automated, drive-through car wash of conventional design, and comprises a plurality of car wash elements 104 such as sprayers, rotating brushes, dryers, and the like (brushes may be omitted in the case of a so-called "touchless" car wash). In the exemplary embodiment, the car wash 102 is a "tunnel wash" in which the wash elements 104 are disposed inside a tunnel structure 106 and a conveyor 108 is used to move the vehicle 110 through the tunnel structure 106, for example by gripping a wheel while the vehicle 110 is in neutral gear.

Although the colloquial term "car wash" is used, the tunnel structure and wash elements will typically accommodate other vehicles such as pick-up trucks, minivans, SUVs, etc. and as such the term "car wash" does not imply a limitation to cars.

The control interface 100 is coupled to a car wash controller 120, which in turn is coupled to the car wash elements 104 for controlling the car wash elements 104 in known manner; the car wash controller 120 is also conventional. The control interface 100 may be, for example, one of those offered by Exact One Company, having an address at 4631 Manitoba Road SE, Calgary, Alberta T2G 4B9 Canada. The car wash controller 120 may be part of a control cabinet, for example the Washworld Razor Ultimate Control Cabinet offered by Washworld, Inc. having an address at 2222 American Blvd., DePere, Wis. 54115 U.S.A. and the car wash controller 120 may be, for example, an Allen Bradley Micrologic 1400 Programmable Logic Controller (PLC) available from Rockwell Automation, having an address at 1201 South Second Street, Milwaukee, Wis. 53204-2496 U.S.A.

The control interface 100 also includes a keypad 122 and a microcontroller 124. In the illustrated embodiment, the keypad 122 is a physical keypad including buttons for the numbers 1 to 9; although not shown in the figures the keypad may include additional buttons, such as buttons for the "pound" (#) and "star" (*) symbols. The keypad 122 may have other configurations, such as alphanumeric, and may alternatively be a touch screen keypad rather than including physical buttons, in which case the keyboard would be integrated with a display. The microcontroller 124 is coupled to the keypad 122 to receive signals therefrom in known manner, and the microcontroller 124 is also coupled to the car wash controller 120 to send signals to, and receive signals from, the car wash controller 120. For example, the microcontroller 124 can instruct the car wash controller 120 to initiate a car wash sequence, and can receive a message from the car wash controller 120 indicating that the car wash 102 is "in use" or "out of service". In the illustrated embodiment, the microcontroller 124 is coupled to the keypad 122 and the car wash controller 120 by way of a control board 126. In particular, the microcontroller 124 is coupled to circuitry on the control board 126 and the keypad 122 and the car wash controller 120 are coupled by wire or other suitable connection to respective terminals 128, 130 on the control board 126. While FIG. 1 shows four terminals 130, this is merely one exemplary embodiment and a control board may have more or fewer terminals for communicating with a car wash controller. The control interface 100 may also include a display 132 coupled to the microcontroller 124 by way of a corresponding terminal 134 on the control board 126. The control interface 100 may optionally also include other components (not shown), such as a bill acceptor, coin acceptor, credit card acceptor, receipt printer and related hardware, as well as buttons for selecting a wash type. One commonly used type of control interface is the "Wash Select II", offered by Unitec, having an address at 7125 Troy Hill Drive, Elkridge, Md. 21075 U.S.A. Typically, in a drive-through car wash such as a "tunnel wash", the keypad 122, microcontroller 124 and control board 126 are located in a housing carried by a post at the entrance to the tunnel structure 106 so that a user can access the keypad 122 through the window of the vehicle 110. For a "self serve" car wash, the user would park and exit their vehicle to access a pay station. The car wash controller 120 need not be located in the housing with the keypad 122, microcontroller 124 and control board 126, but may be located elsewhere. For example, the car wash controller 120 may be located in the car wash structure and coupled to the microcontroller 124 via wires.

The microcontroller 124 is further coupled to a data storage 136 via a corresponding terminal 138 on the control board 126. The data storage 136 stores a group of valid authorization codes 140. Where more than one type of car wash service is offered (e.g. "basic", "deluxe", "ultimate", etc.), each valid authorization code will be associated with a particular type of car wash service. In the illustrated embodiment, the data storage 136 forms part of a point-of-sale (POS) system 142 at the facility where the car wash 102 is located, and the microcontroller 124 may be coupled to the data storage 136 indirectly via a computer system (not shown) that administers the data storage 136, for example as part of the POS system 142. For example, if the car wash 102 is located at a gas station, the POS system 142 may be configured to allow the cash register and pay-at-the-pump fuel pumps to sell car wash services by printing an authorization code for the customer, with the valid authorization codes 140 being stored in the data storage 136. The data storage 136 may comprise multiple pieces of hardware (e.g. more than one disk drive) which may be located at the same site as the car wash 102 and POS system 142 or elsewhere, or may be geographically dispersed in multiple locations.

The microcontroller 124 is configured to receive a keyed authorization code from the keypad 122 and communicate with the data storage 136 to compare the keyed authorization code to the group of valid authorization codes 140. For example, where the microcontroller 124 is coupled to the data storage 136 via the computer system that administers the data storage 136 (e.g. a computer system forming part of the POS system), the microcontroller 124 may send the keyed authorization code to the computer system for the computer system to compare to the group of valid authorization codes 140.

In response to the keyed authorization code matching one of the valid authorization codes in the group of valid authorization codes 140, the microcontroller 124 will instruct the car wash controller 120 to initiate a car washing sequence according to the matched authorization code. For example, if the matched authorization code corresponds to a "basic" car wash, the microcontroller 124 will instruct the car wash controller 120 to initiate the "basic" car washing sequence, and if the matched authorization code corresponds to a "deluxe" car wash, the microcontroller 124 will instruct the car wash controller 120 to initiate the "deluxe" car washing sequence.

Thus, a user may purchase a car wash service, for example at the gas pump if paying at the pump, or at the cash register, and be given a receipt which includes an authorization code. The user may then drive his or her vehicle 110 to the entrance of the tunnel structure 106 and enter the authorization code using the keypad 122 to initiate the car wash service. After the keyed authorization code has been matched, the matched authorization code can be de-authorized, deactivated or removed from the group of valid authorization codes 140.

Figure 2:
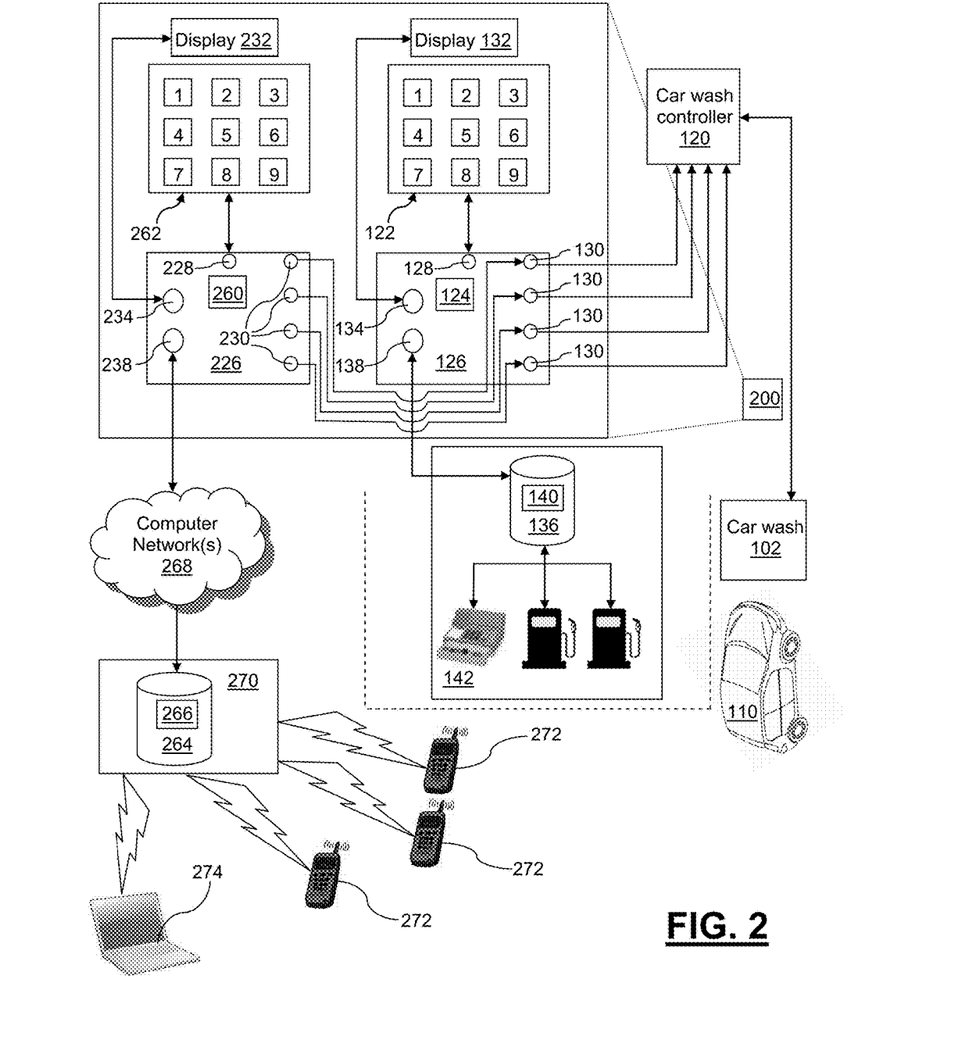
FIG. 2 is a schematic block diagram showing a first exemplary control interface for a car wash according to an aspect of the present disclosure.

Reference is now made to FIG. 2, which is schematic block diagram showing first exemplary control interface 200 according to an aspect of the present disclosure. As will be explained further below, the control interface 200 may be implemented as a retrofit to the control interface 100 shown in FIG. 1, and hence the same reference numerals are used to refer to the components of the control interface 100 shown in FIG. 1. Details of the car wash 102 shown in FIG. 1 are omitted from FIG. 2 for simplicity of illustration.

Because the control interface 200 shown in FIG. 2 includes a second microcontroller 260 and second control board 226, the microcontroller 100 of the control interface 100 shown in FIG. 1 is now referred to as the "first" microcontroller 124 and the control board 126 is referred to as the "first" control board 126. Similarly, the control interface 200 shown in FIG. 2 includes a second data storage 264 storing a second group of valid authorization codes 266, so the data storage 136 and group of valid authorization codes 140 shown in FIG. 1 are now referred to as the "first" data storage 136 and the "first" group of valid authorization codes 140.

The control interface 200 shown in FIG. 2 comprises an additional input device for receiving an authorization code (i.e. in addition to the keypad 122), with the second microcontroller 260 coupled to the additional input device. In the illustrated embodiment, the additional input device is a second keypad 262. Specifically, the second microcontroller 260 is coupled to circuitry on its own control board 226 and is coupled to the second keypad 262 via a terminal 228 and to an optional second display 232 via a terminal 234. In other embodiments, the additional input device may take other forms, for example a barcode reader or a wireless receiver for receiving wireless communication signals. Where the additional input device is a barcode reader, it may take the form of a conventional barcode reader, or it may be a camera such as a CMOS or CCD camera coupled to a processor (either the second microcontroller 260 or a separate processor) adapted to process the image to read the barcode. In the latter case, the barcode may be a conventional barcode, or may be a QR code. Where the additional input device is a wireless receiver, it may, for example, be a wireless receiver for near field communication (NFC) signals, infrared signals or Bluetooth communications and may be able to transmit as well as receive. Other suitable input devices may also be used.

The second microcontroller 260 is also coupled to the car wash controller 120. In the illustrated embodiment, the second microcontroller 260 is coupled to the car wash controller 120 indirectly; the second microcontroller 260 is coupled to the car wash controller 120 by control terminals 230 on the second control board 226 being coupled to the control terminals 130 on the first control board 126 in parallel with the first microcontroller 124. Because the second microcontroller 260 is coupled to the car wash controller 120 in parallel with the first microcontroller 124 via the control terminals 130 on the first control board 126, the car wash controller 120 will respond identically to signals received via the control terminals 130, such as instructions to initiate a "basic" car wash sequence or a "deluxe" car wash sequence, whether those signals originate from the first microcontroller 124 or the second microcontroller 260. In other embodiments, the second microcontroller 260 may be otherwise coupled to the car wash controller 120.

The second microcontroller 260 is coupled by way of a terminal 238 to a second data storage 264 storing a second group of valid authorization codes 266. Like the first data storage 136, the second data storage 264 may comprise multiple pieces of hardware (e.g. more than one disk drive) which may be located at the same site as the car wash 102 and POS system 142 or elsewhere, or may be geographically dispersed in multiple locations. As shown schematically in FIG. 2, the second data storage 264 is logically separate from the first data storage 136, as shown by the dashed line, and will typically be physically separate as well. However, it is contemplated that in some embodiments, the second data storage 264 and the first data storage 136 may reside on a common physical storage medium or media (e.g. the same disk drive(s)) while remaining logically separate from one another.

In the illustrated embodiment, the second microcontroller 260 is coupled to the second data storage 264 via a terminal 238 and one or more computer networks 268, such as an Internet connection. Details of the relevant connection hardware and software for network connection are within the capability of one skilled in the art and are not described further. The second microcontroller 260 is configured to receive an authorization code (a "received authorization code") from the additional input device, in this case the second keypad 262, and to communicate with the second data storage 262 to compare the received authorization code to the second group of valid authorization codes 266. In response to the received authorization code matching one of the valid authorization codes in the second group of valid authorization codes 266, the second microcontroller 260 will instruct the car wash controller 120 to initiate a car wash according to the matched one of the valid authorization codes in the second group of valid authorization codes 266. Once the received authorization code has been matched, the matched authorization code can be de-authorized, deactivated or removed from the second group of valid authorization codes 266.

Adding a second data storage 264 that is logically separate from the first data storage 136 allows for the sale of car wash services via sales channels other than the sales channel with which the first data storage 136 is associated, without the need to integrate those sales channels into the sales channel with which the first data storage 136. For example, in the illustrated embodiment, the first data storage 136 forms part of a POS system 142 at the facility where the car wash 102 is located (e.g. a gas station), and the second data storage 264 is associated with an online (e.g. Internet-based) sales system 270 for ordering car wash services. The use of a second data storage 264 that is logically separate from the first data storage 136 allows authorization codes associated with the online sales system 270 to be handled separately from authorization codes associated with the POS system 142, without any need to directly integrate the online sales system 270 with the POS system 142. Moreover, the respective control interfaces 200 for a plurality of geographically dispersed car washes 102 may be coupled to a single second data storage 264. This allows the second group of valid authorization codes 266 stored in the second data storage 264 to be used to activate one of a plurality of different geographically dispersed car washes 102, or one of a plurality of car washes having different types of POS systems that are not necessarily compatible with one another (e.g. from different manufacturers).

For example, consider a chain of gas stations marketed under a common brand, where some gas stations have automatic car washes. The operators of the chain of gas stations may wish to implement an online sales system 270, for example by way of a mobile website or native mobile application enabling customers to use a smartphone 272 or computer 274 to locate a nearby gas station that has a car wash and purchase the desired car wash services online. The online sales system 270 may be configured to, for each order for car wash services, generate a valid authorization code and store it in the second data storage 264, resulting in a second group of valid authorization codes 266. Those activation codes can be used to activate the car wash 102 at any location having a control interface 200 as shown in FIG. 2 that is suitably coupled to the second data storage 264. As a result, there is no need to link the activation code to the car wash 102 where it is intended to be used, or communicate the activation code to the POS system 142 at that location. Instead, the POS system 142 and the online sales system 270 would operate in parallel, with authorization codes associated with the POS system 142 being stored in the first data storage 136 and authorization codes associated with the online sales system 270 being stored in the second data storage 264. Because the second group of valid authorization codes 266 stored in the second data storage 264 may be used to activate one of a plurality of different geographically dispersed car washes 102, a customer who had purchased car wash services through the online sales system 270 could even change his or her plans and use the authorization code to activate a car wash at a different location than he or she originally intended.

Authorization codes obtained using the POS system 142 may be considered "local" authorization codes since they are obtained locally at the location associated with the POS system 142 and are often limited to that location. Authorization codes obtained using the online sales system 270 may be considered "remote" or "global" authorization codes, since they can be obtained elsewhere than the POS system 142 and can be used at any location where the control interface 200 is suitably coupled to the second data storage 264. An authorization code obtained using the online sales system 270 may be "remote" but not "global", since it might be ordered remotely from the physical location of the car wash 102 but be limited to the car wash 102 at that location. Conversely, an authorization code obtained using the online sales system 270 may be "global" but not "remote", since it might be ordered (for example) from an Internet-connected kiosk at the location of one of a plurality of car washes with which it can be used.

Where the additional input device is a second keypad, the remote or global authorization code may be communicated to the customer in a human-perceptible form, such as via e-mail, text message, voice message, returned web page or other screen display, etc. The user could then drive up to the entrance to the tunnel structure 106 and enter the authorization code using the second keypad 262. The control interface 200 may have posted information associated therewith (e.g. a sign) indicating that if the car wash service was purchased using the POS system 142 at the location (e.g. from a gas pump or cash register) the first keypad 122 should be used and that if the car wash service was purchased using the online sales system 270, the second keypad 262 should be used. If the additional input device is a barcode reader or wireless receiver, the authorization code would be communicated in a form readable by the additional input device.

A car wash control interface 100 as shown in FIG. 1 can be retrofit to become a car wash control interface 200 as shown in FIG. 2 as follows. The housing containing the first microcontroller 124 and control board 126 is opened, and the second microcontroller 260 and second control board 226 are placed inside. The terminals 230 on the second control board 226 are then wired to the terminals 130 on the first control board 126 (which are already wired to the car wash controller 120) and coupled to the power source in the housing. Holes can be drilled in the housing to allow the second microcontroller 260 to be wired, via the second control board 226, to the second keypad 262 (or other input device) and to the network hardware (not shown) for enabling the second microcontroller 260 to communicate with the second data storage 264; the network hardware may be located outside the housing, for example inside a building. Alternatively, the second microcontroller 260 may be coupled to a wireless network device, such as a wireless modem, which is located within the housing and communicates with additional network hardware located outside of the housing. The second keypad 262 (or other input device) will typically be secured in its own separate housing, which may be attached to the housing containing the first microcontroller 124 and control board 126, for example by bolting or welding. The drilled holes and any cabling can be suitably weatherproofed as is known in the art.

Other systems, apparatus and methods for implementing the concept of using a first data storage storing a first group of valid authorization codes and a second data storage storing a second group of valid authorization codes will now be described; certain details which will be apparent from the foregoing description are not be repeated in describing these other systems, apparatus and methods.

Figure 3:
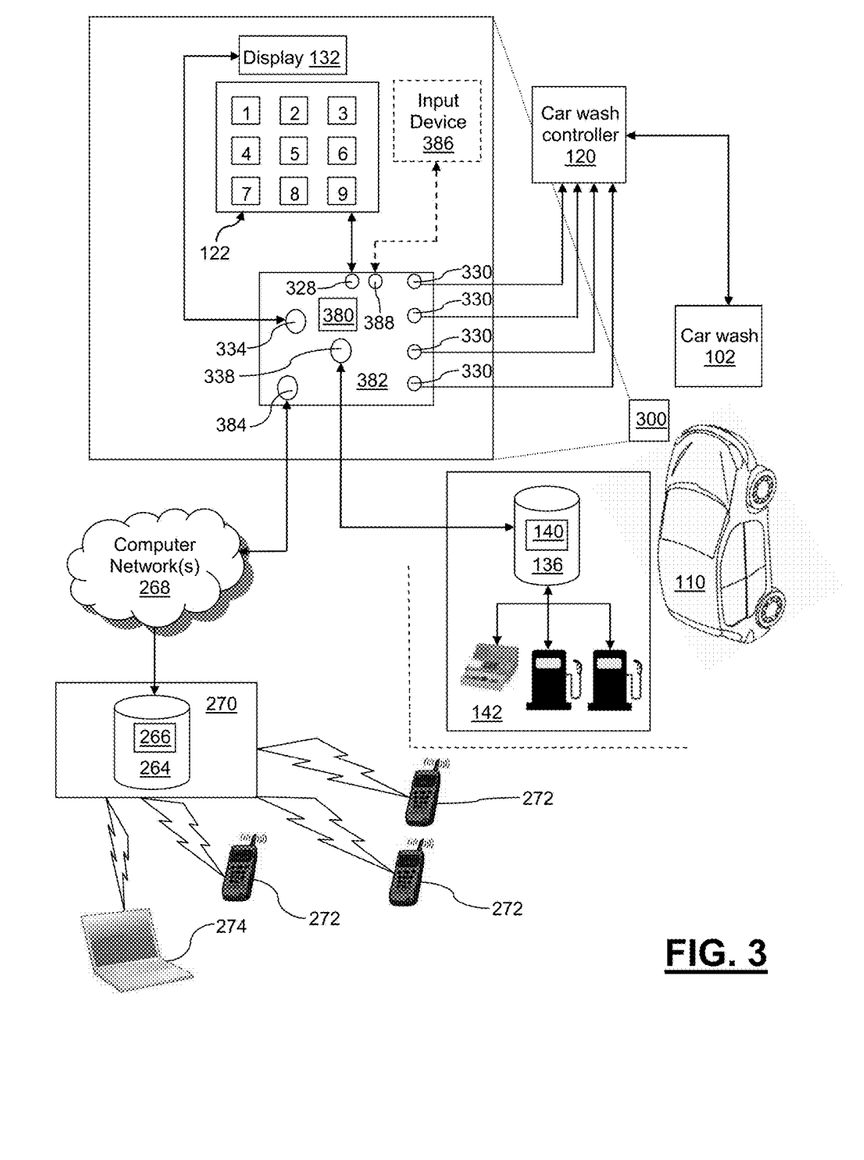
FIG. 3 is a schematic block diagram showing a second exemplary control interface for a car wash according to an aspect of the present disclosure.

Reference is now made to FIG. 3, which shows another exemplary control interface 300 for a car wash 102. The control interface 300 shown in FIG. 3 is in certain respects similar to the control interface 200 shown in FIG. 2, with like reference numerals denoting like features. Thus, the control interface 300 comprises a car wash controller 120 coupled to a plurality of car wash elements, a keypad 122 and a single microcontroller 380. Details of the car wash 102 shown in FIG. 1 are again omitted for simplicity of illustration. The control interface 100 shown in FIG. 1 may be converted to the control interface 300 shown in FIG. 3 by, for example, replacing the microcontroller 124 and control board 126 in the control interface 100 shown in FIG. 1 with a new microcontroller 380 and control board 382, or reprogramming the microcontroller 124 to become the microcontroller 380 and coupling the new/reprogrammed microcontroller 380 to the car wash controller 120, keypad 122, first data storage 136 and second data storage 264.

The microcontroller 380 is coupled to circuitry on a control board 382, and is coupled by way of terminals 328, 330, 334 to the keypad 122, car wash controller 120 and display 132, respectively. The microcontroller 380 is also coupled by way of terminal 338 to a first data storage 136 containing a first group of valid authorization codes 140 and via terminal 384 and computer network(s) 268 to a second data storage 264 containing a second group of valid authorization codes 266. The first data storage 136 forms part of a POS system 142 at the facility (e.g. a gas station) where the car wash 102 is located. The microcontroller 380 is configured to communicate with the first data storage 136 via the POS system 142. The particular configuration of the microcontroller 380 and control board 382 will depend on the particular POS system 142 with which they are to communicate (i.e. depending on the manufacturer, model, etc. of the relevant components of the POS system 142). Configuration of the microcontroller 380 and control board 382 is within the capability of one skilled in the art when the parameters of the relevant POS system 142 are known. The second data storage 264 is associated with an online (e.g. Internet-based) sales system 270 for ordering car wash services. The second data storage 264 is logically separate from the first data storage 136, and is typically physically separate as well.

The microcontroller 380 is configured to receive a keyed authorization code from the keypad 122 and determine whether the keyed authorization code is associated with the first group of valid authorization codes 140 or the second group of valid authorization codes 266. Determining whether the keyed authorization code is associated with the first group of valid authorization codes 140 or the second group of valid authorization codes 266 may be carried out in a number of different ways.

One approach is for the microcontroller 380 to first check whether the keyed authorization code matches any valid authorization code in the first group of valid authorization codes 140 and, if the keyed authorization code fails to match any of the valid authorization codes in the first group of valid authorization codes 140, determine that the keyed authorization code is associated with the second group of valid authorization codes 266. In other words, the microcontroller 380 "assumes" that if the keyed authorization code does not match any local authorization code then it is likely a remote or global authorization code. Alternatively, the microcontroller 380 may first check whether the keyed authorization code matches a remote or global authorization code, however, as a practical matter it is expected that there will be a substantially larger number of remote or global authorization codes than local authorization codes such that it will be more efficient to first check whether the keyed authorization code matches a local authorization code.

Another approach is for the microcontroller 380 to be configured to determine whether the keyed authorization code is associated with the first group of valid authorization codes 140 or the second group of valid authorization codes 266 according to the format of the keyed authorization code. For example, the length of the keyed character string, the first character in the string, the last character in the string or some combination thereof may be used to designate whether the keyed authorization code is associated with the first group of valid authorization codes 140 or the second group of valid authorization codes 266.

Still another approach is for the microcontroller 380 to be configured to determine whether the keyed authorization code is associated with the first group of valid authorization codes 140 or the second group of valid authorization codes 266 according to an indicator signal. For example, the keypad 122 may be provided with an additional button (not shown) with a label such as "press here if you purchased your car wash online", which button will provide an indicator signal to the microcontroller 380 indicating that the keyed authorization code is associated with the second group of valid authorization codes 266. Similarly, a special sequence of keypad buttons, such as two "pound" (#) or two "star" (*) buttons, may be used as an indicator signal.

Yet another approach is to provide an additional input device 386 (shown in dashed lines), such as a second keypad, a barcode reader or a wireless receiver, coupled to the microcontroller 380 via a terminal 388 on the control board 382. This will enable the microcontroller 380 to determine whether the keyed authorization code is associated with the first group of valid authorization codes 140 or the second group of valid authorization codes 266 based on the input device used. For example, the microcontroller 380 could "assume" that an authorization code received from the keypad 122 is associated with the first group of valid authorization codes 140 and that an authorization code received from the additional input device 386 is associated with the second group of valid authorization codes 266.

The microcontroller 380 is configured such that, if it determines that the keyed authorization code is associated with the first group of valid authorization codes 140, it will communicate with the first data storage 136 to compare the keyed authorization code to the first group of valid authorization codes. If the keyed authorization code matches one of the valid authorization codes in the first group of valid authorization codes, the microcontroller 380 will instruct the car wash controller 120 to initiate a car wash according to the matched authorization code. Similarly, the microcontroller 380 is further configured such that, if it determines that the keyed authorization code is associated with the second group of valid authorization codes 266, it will communicate with the second data storage 264 to compare the keyed authorization code to the second group of valid authorization codes 266. If the keyed authorization code matches one of the valid authorization codes in the second group of valid authorization codes 266, the microcontroller 380 will instruct the car wash controller 120 to initiate a car wash according to the matched authorization code.

The respective control interfaces 300 for a plurality of geographically dispersed car washes 102 may be coupled to a single second data storage 264.

Figure 4:
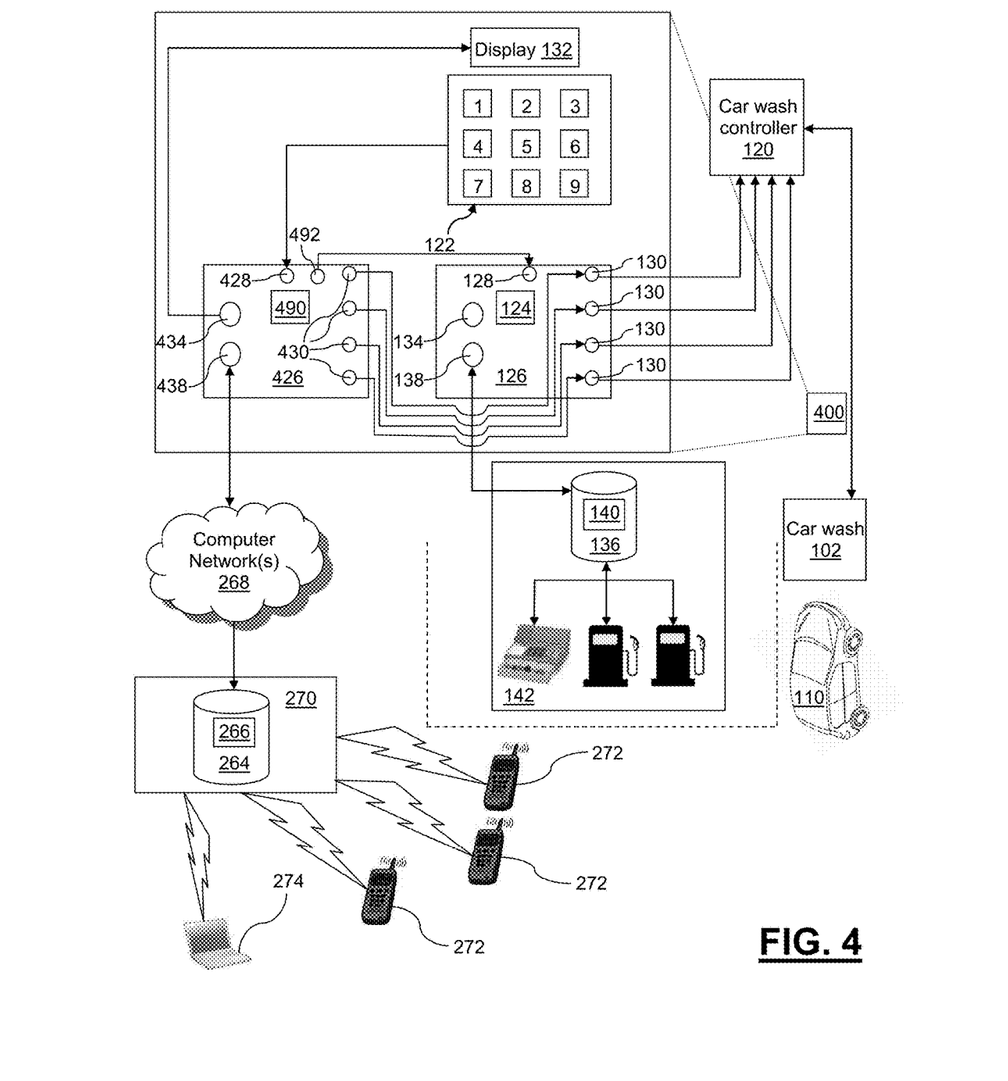
FIG. 4 is a schematic block diagram showing a third exemplary control interface for a car wash according to an aspect of the present disclosure.

Reference is now made to FIG. 4, which shows another exemplary control interface 400 for a car wash (details of the car wash 102 are again omitted for simplicity of illustration). The control interface 400 shown in FIG. 4 is similar to the control interface 300 shown in FIG. 3 except that instead of replacing or reprogramming the (first) microcontroller 124 in the control interface 100 (FIG. 1), the control interface 100 is modified by electronically interposing a second microcontroller 490 between the keypad 122 and the first microcontroller 124.

Thus, in FIG. 4 the first microcontroller 124 is coupled to the car wash controller 120 by way of the terminals 130 on the control board 126, and is further coupled to the first data storage 136 via a corresponding terminal 138 on the control board 126. However, the first microcontroller 124 is not directly coupled to the keypad 122. The second microcontroller 490 is coupled to circuitry on its own control board 426, and is coupled to the keypad 122 and the display 132 by way of respective terminals 428, 434 on the control board 426. Similarly to the arrangement shown in FIG. 2, the second microcontroller 490 is coupled to the car wash controller 120 by control terminals 430 on the second control board 426 being coupled to the control terminals 130 on the first control board 126 in parallel with the first microcontroller 124. The first microcontroller 124 continues to be coupled to the car wash controller 120 by way of terminals 130 on its control board 126 and to the first data storage 136 via a corresponding terminal 138 on the first control board 126. The first data storage 136 forms part of the POS system and stores a first group of valid authorization codes 140, which are local authorization codes.

The second microcontroller 490 is coupled, by way of terminal 438 and computer network(s) 268, to the second data storage 264 containing the second group of valid authorization codes 266; the second data storage 264 is associated with the online sales system 270 and the second group of valid authorization codes 266 are remote or global authorization codes. The second microcontroller 490 is also coupled to the first microcontroller 124. In particular, a terminal 492 on the control board 426 for the second microcontroller 490 is coupled to the terminal 128 on the control board 126 that would ordinarily be coupled to the keypad 122 but is disconnected therefrom. From the perspective of the first microcontroller 124, signals received from the second microcontroller 490 via the terminal 128 are perceived and treated as if they were signals from the keypad 122. In other words, the first microcontroller 124 does not "know" that it is receiving signals from the second microcontroller 490 instead of the keypad 122 to which it was originally connected.

The second microcontroller 490 is configured to receive a keyed authorization code from the keypad 122 and determine whether the keyed authorization code is associated with the first group of valid authorization codes 140 (the local authorization codes) or the second group of valid authorization codes 266 (the remote or global authorization codes). Preferably, the second microcontroller 490 is configured to determine whether the keyed authorization code is associated with the first group of valid authorization codes 140 or the second group of valid authorization codes 266 according to the format of the keyed authorization code or from an indicator signal as described above, although other suitable approaches may also be used.

If the second microcontroller 490 determines that the keyed authorization code is associated with the first group of valid authorization codes 140, i.e. that the keyed authorization code is a local authorization code, the second microcontroller 490 will transmit the keyed authorization code to the first microcontroller 124 via the terminals 492 and 128. The first microcontroller 124 will treat the keyed authorization code received via the terminal 128 as if it came from the keypad 122. Thus, responsive to receiving the keyed authorization code from the second microcontroller 490, the first microcontroller 124 will communicate with the first data storage 136 to compare the keyed authorization code to the first group of valid authorization codes 140. If the keyed authorization code matches one of the valid authorization codes in the first group of valid authorization codes 140, the first microcontroller 124 will instruct the car wash controller 120 to initiate a car wash according to the matched authorization code.

If the second microcontroller 490 determines that the keyed authorization code is associated with the second group of valid authorization codes 266, i.e. that the keyed authorization code is a remote or global authorization code, the second microcontroller 490 will communicate with the second data storage 262 to compare the keyed authorization code to the second group of valid authorization codes 266. If the keyed authorization code matches one of the valid authorization codes in the second group of valid authorization codes 266, the second microcontroller 260 will instruct the car wash controller 120 to initiate a car wash according to the matched one of the valid authorization codes in the second group of valid authorization codes 266. The respective control interfaces 400 for a plurality of geographically dispersed car washes 102 may be coupled to a single second data storage 264.

Reference has been made to microcontrollers 124, 260, 380 and 490. While each of these was treated as a single individual microcontroller for simplicity of illustration and explanation, one skilled in the art will appreciate that microcontrollers 124, 260, 380 and 490 may in practice each comprise one or more physical microcontrollers operating in cooperation. Similarly, while control boards 126, 226, 382, 426 are shown schematically as single control boards, each may, in practice, comprise a plurality of control boards. In some embodiments, the control boards 226, 382 and 426 may be, for example, Raspberry Pi B+ control boards, available from, for example, RS Components Ltd. having an address at Birchington Road, Corby, Northants NN17 9RS U.K. and hence the microcontrollers 260, 380 and 490 may each be a model BCM2835 SoC ("System on a Chip") offered by Broadcom Limited, having an address at 1320 Ridder Park Drive, San Jose, Calif. 95131 U.S.A.

The exemplary apparatus described above implement methods for controlling a car wash.

Figure 5:
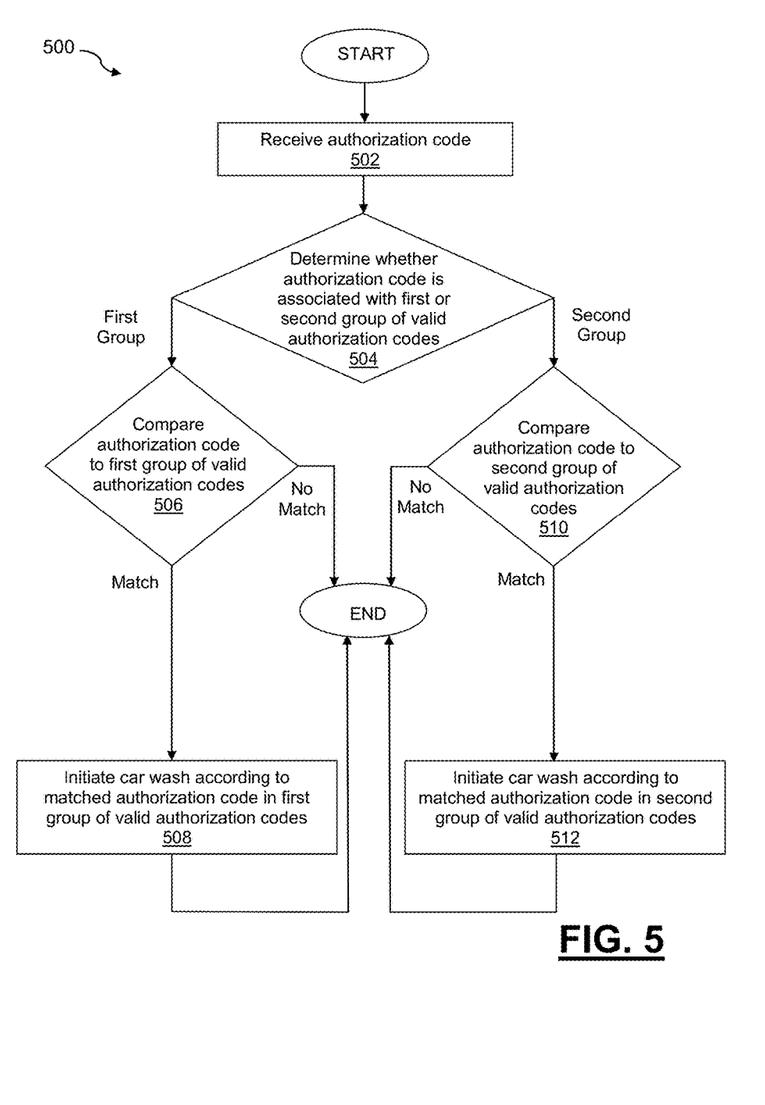
FIG. 5 is a flow chart showing a first exemplary method for controlling a car wash.

Reference is now made to FIG. 5, which shows, in flow chart form, a first exemplary method 500 for controlling a car wash. At step 502, the method 500 receives an authorization code, and at step 504 the method 500 determines whether the authorization code is associated with a first group of valid authorization codes stored in a first storage or a second group of valid authorization codes stored in a second storage. Step 504 may, for example, be carried out by using the a format of the authorization code to determine whether the authorization code is associated with the first group of valid authorization codes stored or the second group of valid authorization codes, or based on an input device via which the authorization code was received, or based on an indicator signal.

At step 506, responsive to a determination at step 504 that the authorization code is associated with the first group of valid authorization codes, the method 500 compares the authorization code to the first group of valid authorization codes. At step 508, responsive to the authorization code matching one of the valid authorization codes in the first group of valid authorization codes, the method 500 initiates the car wash according to the matched one of the valid authorization codes in the first group of valid authorization codes, after which the method ends. If step 506 determines that the authorization code does not match any of the valid authorization codes in the first group of valid authorization codes, the method 500 ends. At step 510, responsive to a determination at step 504 that the authorization code is associated with the second group of valid authorization codes, the method 500 compares the authorization code to the second group of valid authorization codes. At step 512, responsive to the authorization code matching one of the valid authorization codes in the second group of valid authorization codes, the method 500 initiates the car wash according to the matched one of the valid authorization codes in the second group of valid authorization codes, after which the method ends. If the method determines at step 510 the authorization code does not match any of the valid authorization codes in the second group of valid authorization codes, the method 500 ends.

Figure 6:
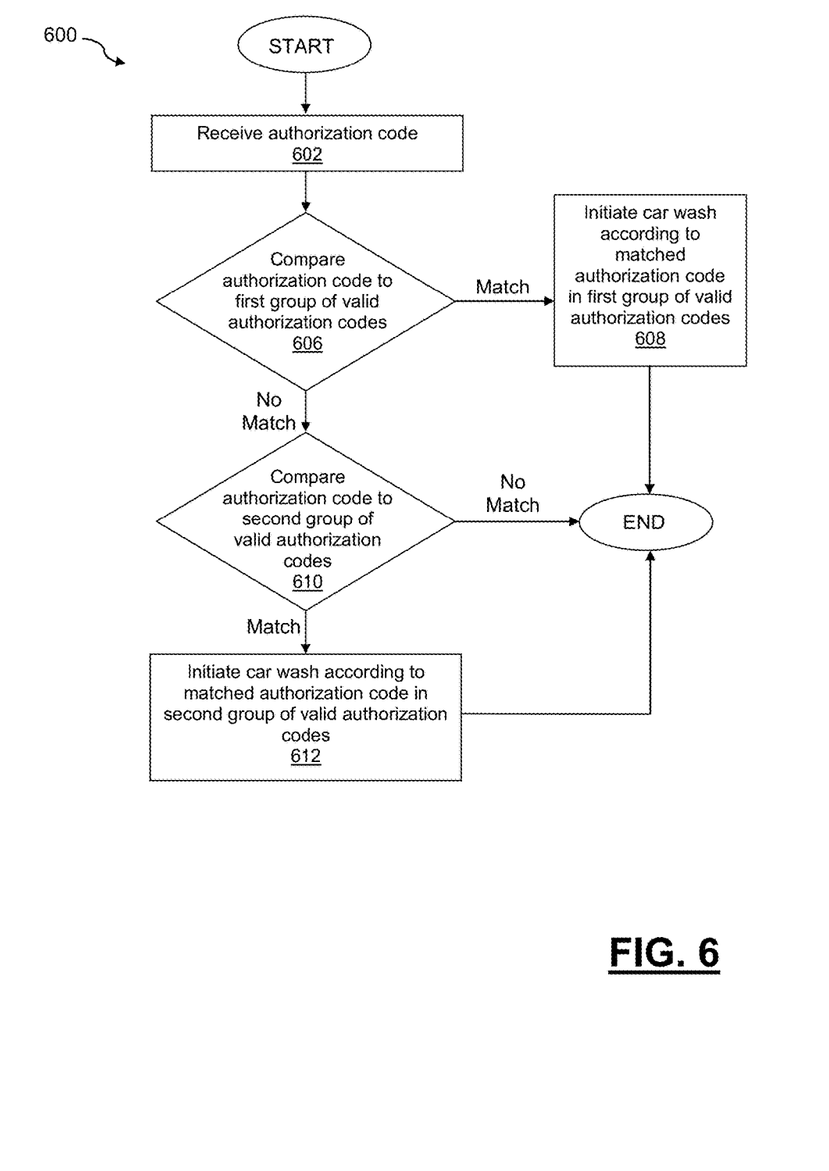
FIG. 6 is a flow chart showing a second exemplary method for controlling a car wash.

FIG. 6 shows, in flow chart form, a second exemplary method 600 for controlling a car wash. At step 602, the method 600 receives an authorization code, and at step 606 the method 600 compares the authorization code to a first group of valid authorization codes stored in a first storage. At step 608, responsive to the authorization code matching one of the valid authorization codes in the first group of valid authorization codes at step 606, the method 600 initiates the car wash according to the matched one of the valid authorization codes in the first group of valid authorization codes, after which the method 600 ends. At step 610, responsive to a determination at step 606 that the authorization code fails to match any of the valid authorization codes in the first group of valid authorization codes, the method 600 compares the authorization code to the second group of valid authorization codes. At step 612, responsive to the authorization code matching one of the valid authorization codes in the second group of valid authorization codes, the method 600 initiates the car wash according to the matched one of the valid authorization codes in the second group of valid authorization codes, after which the method 600 ends. If the method 600 determines at step 610 that the authorization code fails to match any of the valid authorization codes in the second group of valid authorization codes, the method 600 ends.

Although the above apparatus, systems and methods have been described in the context of car wash services because they are considered to have particular application to that industry, they can be applied to other access control applications where access may be purchased or otherwise obtained either locally or remotely. For example, apparatus, systems and methods as described above could be applied to access-controlled parking facilities to operate access control barriers. Other suitable applications include public laundry facilities, theme park rides, event admissions (e.g. sporting events, concerts, museum access) and public transit (e.g. subway turnstiles).

As can be seen from the above description, the control interfaces and methods described herein represent significantly more than merely using categories to organize, store and transmit information and organizing information through mathematical correlations. The control interfaces and methods are in fact an improvement to the field of code-based access control technology, as they provide a compact and efficient method for enabling the use of authorization codes from multiple sources without having to directly integrate those sources. The control interfaces and methods described herein are also versatile, as they allow authorization codes from a single source to be used at a plurality of different geographically dispersed sites having different types of local POS systems that are not necessarily compatible with one another, while still permitting use of authorization codes generated by the local POS at each site. Moreover, the technology is applied by using a particular machine, namely an access control system. As such, the control interfaces and methods described herein are confined to code-based access control applications.

Several embodiments have been described by way of example. It will be apparent to persons skilled in the art that a number of variations and modifications can be made without departing from the scope of the claims.

What is claimed is:

1. A control interface for a car wash, comprising:
a car wash controller coupled to a plurality of car wash elements for controlling the car wash elements;
a keypad;
a first microcontroller;
the first microcontroller coupled to the keypad;
the first microcontroller coupled to the car wash controller;
the first microcontroller coupled to a first data storage containing a first group of valid authorization codes;
the first microcontroller configured to:
receive a keyed authorization code from the keypad;
communicate with the first data storage to compare the keyed authorization code to the first group of valid authorization codes; and
responsive to the keyed authorization code matching one of the valid authorization codes in the first group of valid authorization codes, instruct the car wash controller to initiate a car wash according to the matched one of the valid authorization codes in the first group of valid authorization codes;
an additional input device;
a second microcontroller coupled to the additional input device;
the second microcontroller coupled to the car wash controller;
the second microcontroller coupled to a second data storage containing a second group of valid authorization codes;
the second microcontroller configured to:
receive an authorization code from the additional input device;
communicate with the second data storage to compare the received authorization code to the second group of valid authorization codes; and
responsive to the received authorization code matching one of the valid authorization codes in the second group of valid authorization codes, instruct the car wash controller to initiate a car wash according to the matched one of the valid authorization codes in the second group of valid authorization codes;
wherein:
one of the first data storage and the second data storage forms part of a point of sale (POS) system located at a facility where the car wash is located;
the other of the first data storage and second data storage is associated with an online sales system for ordering car wash services; and
the first data storage and the second data storage are logically separate from one another.

2. The control interface of claim 1, wherein the additional input device is a second keypad.

3. The control interface of claim 1, wherein the additional input device is a barcode reader.

4. The control interface of claim 1, wherein the additional input device is a wireless receiver for receiving wireless communication signals.

5. The control interface of claim 1, wherein the second microcontroller is coupled directly to the car wash controller.

6. The control interface of claim 1, wherein the second microcontroller is coupled indirectly to the car wash controller.

7. The control interface of claim 6, wherein the second microcontroller is coupled indirectly to the car wash controller by the second microcontroller being coupled to the first microcontroller.

8. The control interface of claim 6, wherein:
the first microcontroller is coupled to the car wash controller indirectly by the first microcontroller being coupled to control terminals on a control board;
the control board being coupled to the car wash controller; and
the second microcontroller is coupled to the car wash controller by being coupled to the control terminals on the control board in parallel with the first microcontroller.

9. A control interface for a car wash, comprising:
a car wash controller coupled to a plurality of car wash elements for controlling the car wash elements;
a keypad;
a first microcontroller;
the first microcontroller coupled to the keypad;
the first microcontroller coupled to the car wash controller;
the first microcontroller coupled to a first data storage containing a first group of valid authorization codes;
the first microcontroller coupled to a second data storage containing a second group of valid authorization codes;
the first microcontroller configured to:
receive a keyed authorization code from the keypad;
determine whether the keyed authorization code is associated with the first group of valid authorization codes or the second group of valid authorization codes;
responsive to a determination that the keyed authorization code is associated with the first group of valid authorization codes:
communicate with the first data storage to compare the keyed authorization code to the first group of valid authorization codes; and
responsive to the keyed authorization code matching one of the valid authorization codes in the first group of valid authorization codes, instruct the car wash controller to initiate a car wash according to the matched one of the valid authorization codes in the first group of valid authorization codes;

wherein:
one of the first data storage and the second data storage forms part of a point of sale (POS) system located at a facility where the car wash is located;
the other of the first data storage and second data storage is associated with an online sales system for ordering car wash services; and
the first data storage and the second data storage are logically separate from one another.

10. The control interface of claim 9, wherein the first microcontroller is further configured to, responsive to a determination that the keyed authorization code is associated with the second group of valid authorization codes:
communicate with the second data storage to compare the keyed authorization code to the second group of valid authorization codes; and
responsive to the keyed authorization code matching one of the valid authorization codes in the second group of valid authorization codes, instruct the car wash controller to initiate a car wash according to the matched one of the valid authorization codes in the second group of valid authorization codes.

11. The control interface of claim 9, wherein:
the first microcontroller is coupled to a second microcontroller;
the second microcontroller is coupled to the car wash controller;
the first microcontroller is further configured to, responsive to a determination that the keyed authorization code is associated with the second group of valid authorization codes, transmit the keyed authorization code to the second microcontroller; and
the second microcontroller is configured to, responsive to receiving the keyed authorization code from the first microcontroller:
communicate with the second data storage to compare the keyed authorization code to the second group of valid authorization codes; and
responsive to the keyed authorization code matching one of the valid authorization codes in the second group of valid authorization codes, instruct the car wash controller to initiate a car wash according to the matched one of the valid authorization codes in the second group of valid authorization codes.

12. The control interface of claim 11, wherein the determination that the keyed authorization code is associated with the second group of valid authorization codes results from the keyed authorization code failing to match any of the valid authorization codes in the first group of valid authorization codes.

13. The control interface of claim 9, wherein the first microcontroller is configured to determine whether the keyed authorization code is associated with the first group of valid authorization codes or the second group of valid authorization codes according to a format of the keyed authorization code.

14. The control interface of claim 9, wherein the first microcontroller is configured to determine whether the keyed authorization code is associated with the first group of valid authorization codes or the second group of valid authorization codes according to an indicator signal.

15. The control interface of claim 9, further comprising an additional input device coupled to the microcontroller, wherein the first microcontroller is configured to determine whether the keyed authorization code is associated with the first group of valid authorization codes or the second group of valid authorization codes based on the input device used wherein an authorization code received from the keypad is associated with the first group of valid authorization codes and an authorization code received from the additional input device is associated with the second group of valid authorization codes.

16. A method for controlling a car wash, comprising:
receiving an authorization code;
determining whether the authorization code is associated with a first group of valid authorization codes stored in a first data storage or a second group of valid authorization codes stored in a second data storage;
wherein:
one of the first data storage and the second data storage forms part of a point of sale (POS) system located at a facility where the car wash is located;
the other of the first data storage and second data storage is associated with an online sales system for ordering car wash services; and
the first data storage and the second data storage are logically separate from one another;
responsive to a determination that the authorization code is associated with the first group of valid authorization codes:
comparing the authorization code to the first group of valid authorization codes; and
responsive to the authorization code matching one of the valid authorization codes in the first group of valid authorization codes, initiating the car wash according to the matched one of the valid authorization codes in the first group of valid authorization codes;
responsive to a determination that the authorization code is associated with the second group of valid authorization codes:
comparing the authorization code to the second group of valid authorization codes; and
responsive to the authorization code matching one of the valid authorization codes in the second group of valid authorization codes, initiating the car wash according to the matched one of the valid authorization codes in the second group of valid authorization codes.

17. The method of claim 16, wherein determining whether the authorization code is associated with a first group of valid authorization codes stored in a first data storage or a second group of valid authorization codes stored in a second data storage comprises determining a format of the authorization code.

18. The method of claim 16, wherein determining whether the authorization code is associated with a first group of valid authorization codes stored in a first data storage or a second group of valid authorization codes stored in a second storage is based on an input device via which the authorization code was received.

19. A method for controlling a car wash, comprising:
receiving an authorization code;
comparing the authorization code to a first group of valid authorization codes stored in a first storage;
responsive to the authorization code matching one of the valid authorization codes in the first group of valid authorization codes, initiating the car wash according to the matched one of the valid authorization codes in the first group of valid authorization codes; and responsive to a determination that the authorization code fails to match any of the valid authorization codes in the first group of valid authorization codes:
  comparing the authorization code to a second group of valid authorization codes in a second storage; and
  responsive to the authorization code matching one of the valid authorization codes in the second group of valid authorization codes, initiating the car wash according to the matched one of the valid authorization codes in the second group of valid authorization codes;
wherein:
  one of the first data storage and the second data storage forms part of a point of sale (POS) system located at a facility where the car wash is located;
  the other of the first data storage and second data storage is associated with an online sales system for ordering car wash services; and
  the first data storage and the second data storage are logically separate from one another.

20. A method for controlling a car wash, comprising:
receiving a first authorization code from a first input device;
comparing the first authorization code to a first group of valid authorization codes stored in a first storage;
responsive to the authorization code matching one of the valid authorization codes in the first group of valid authorization codes, initiating the car wash according to the matched one of the valid authorization codes in the first group of valid authorization codes;
receiving a second authorization code from a second input device;
comparing the second authorization code to a second group of valid authorization codes in a second storage; and
responsive to the authorization code matching one of the valid authorization codes in the second group of valid authorization codes, initiating the car wash according to the matched one of the valid authorization codes in the second group of valid authorization codes;
wherein:
  one of the first data storage and the second data storage forms part of a point of sale (POS) system located at a facility where the car wash is located;
  the other of the first data storage and second data storage is associated with an online sales system for ordering car wash services; and
  the first data storage and the second data storage are logically separate from one another.

* * * * *